Figure 2:
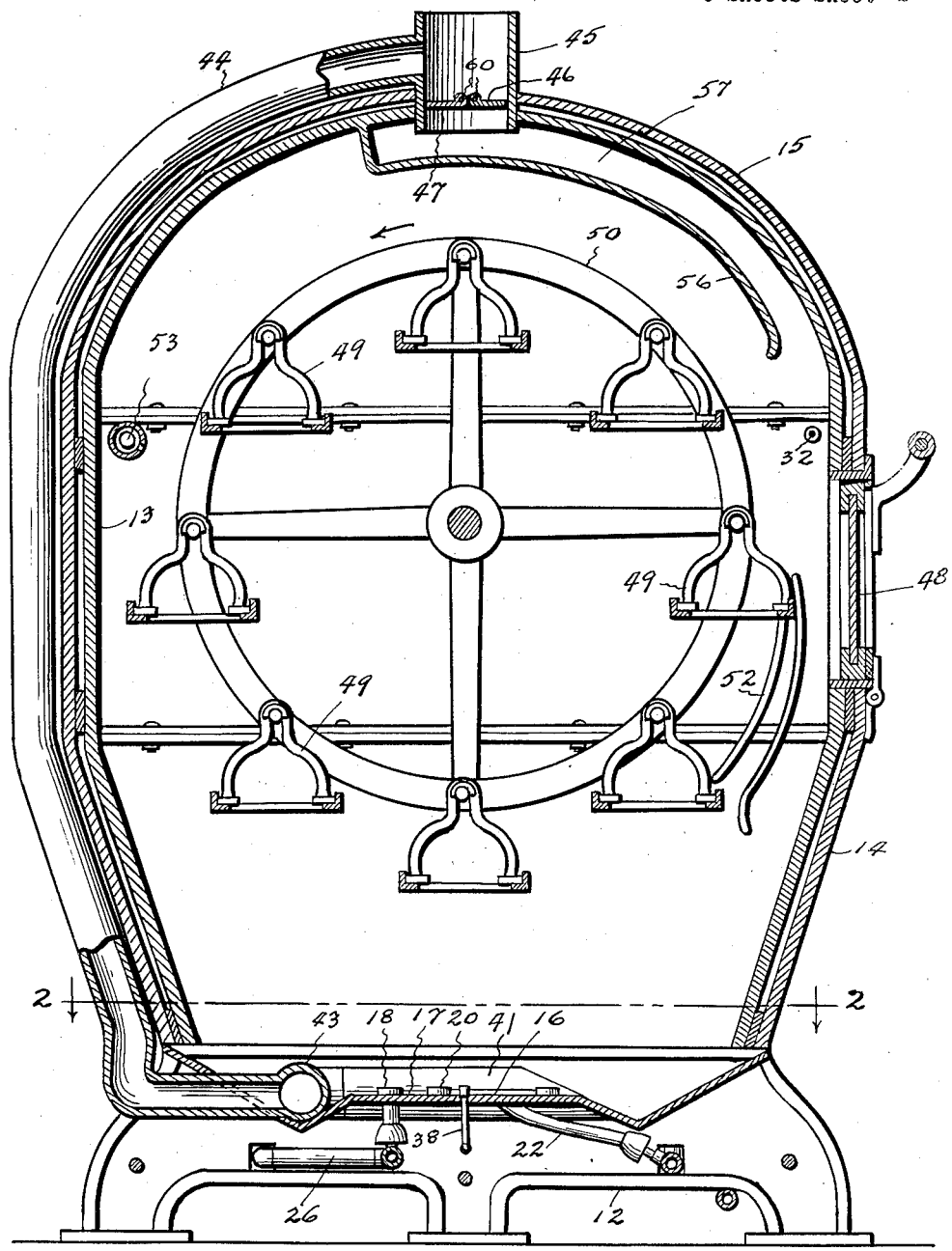

Sept. 2, 1930.   L. D. HOULIS   1,774,651
BAKING OVEN
Filed Feb. 21, 1929   3 Sheets-Sheet 1
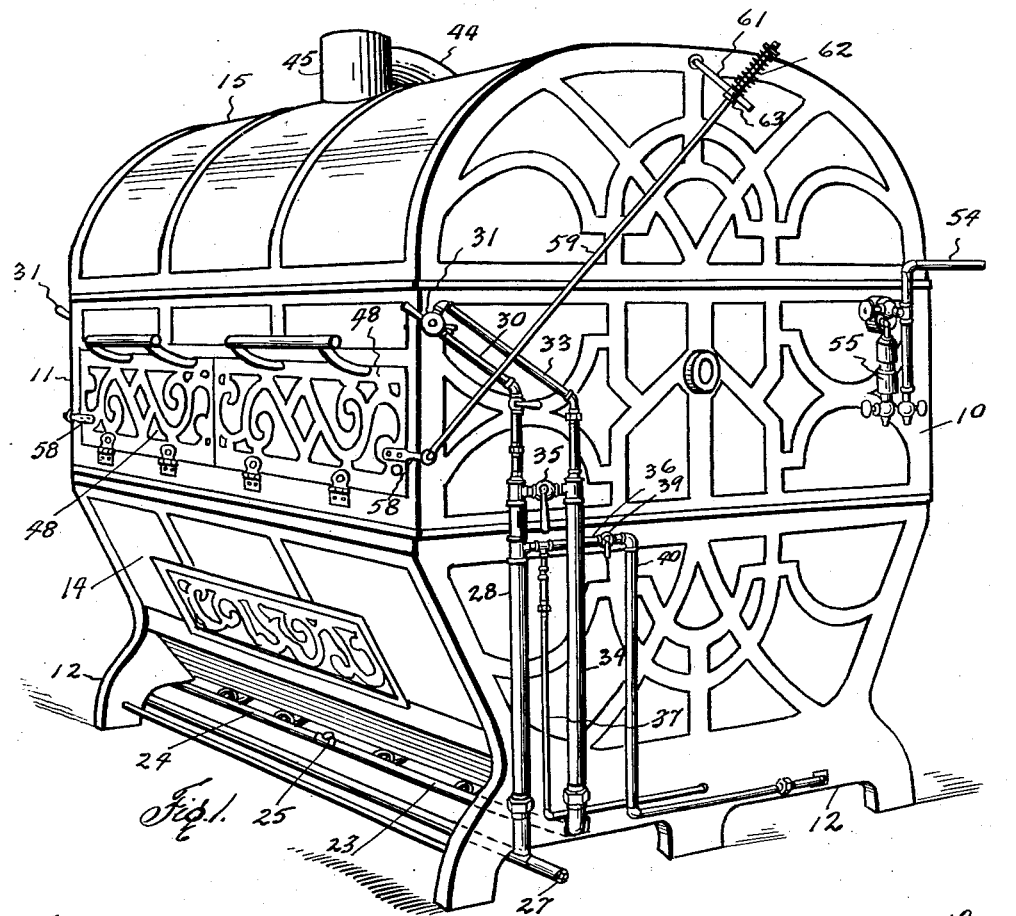
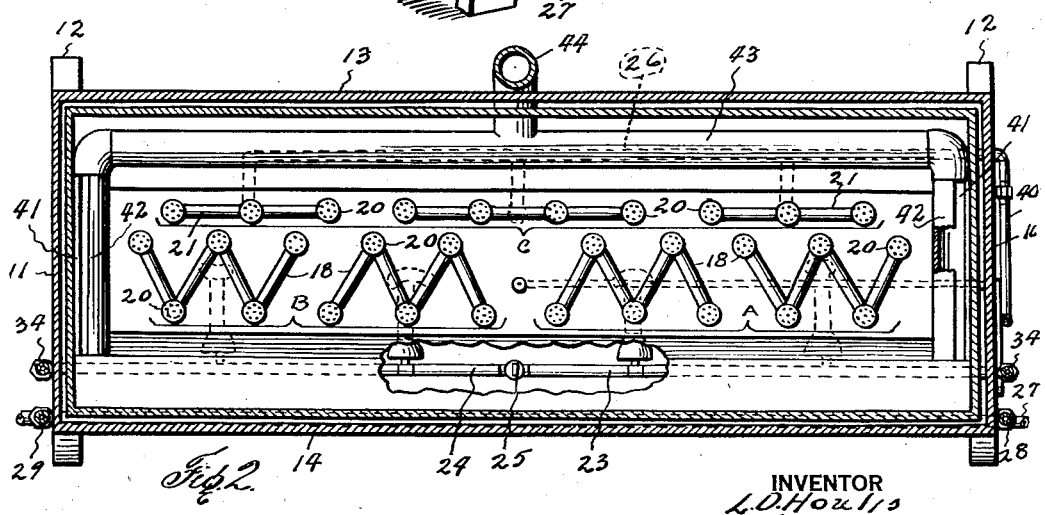
INVENTOR
L. D. Houlis
BY Jack A. Ashley
ATTORNEY Sept. 2, 1930.  L. D. HOULIS  1,774,651
BAKING OVEN
Filed Feb. 21, 1929  3 Sheets-Sheet 3
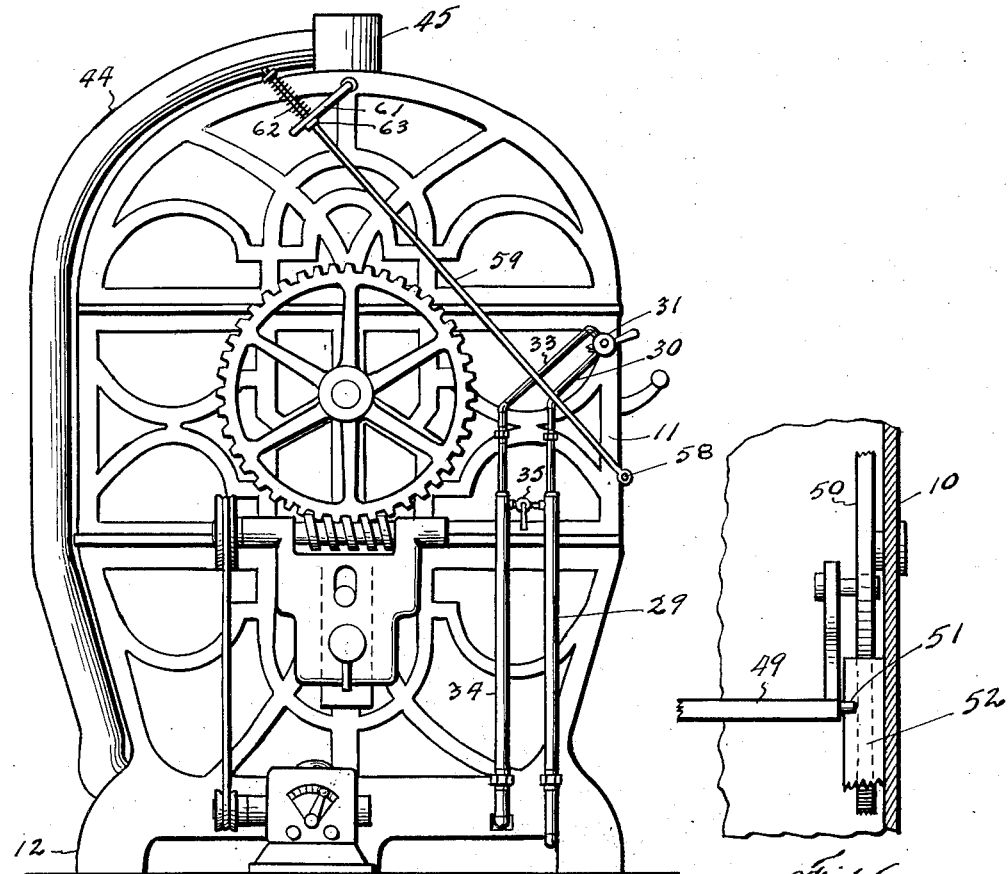
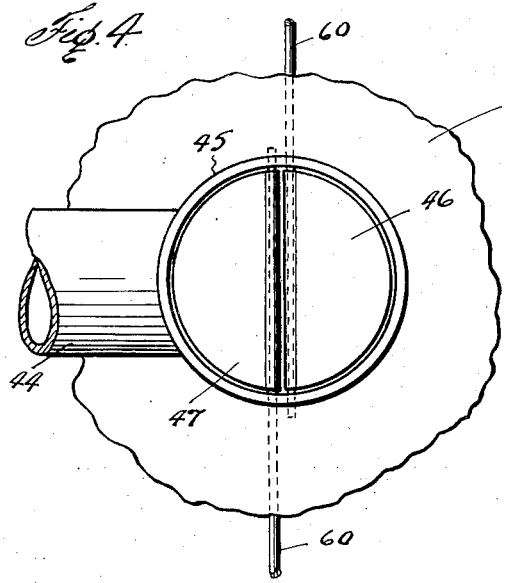
INVENTOR
L. D. Houlis
BY
ATTORNEY Patented Sept. 2, 1930

1,774,651

UNITED STATES PATENT OFFICE

LOUIS D. HOULIS, OF DALLAS, TEXAS

BAKING OVEN

Application filed February 21, 1929. Serial No. 341,636.

This invention relates to new and useful improvements in baking ovens.

One object of the invention is to provide an oven having a fire box at its lower end closed to the admission of air, except that which enters with the gas, whereby cold air is prevented from entering the baking chamber from the fire box and cooling the oven to a disadvantage.

Another object of the invention is to bypass the air currents from the oven through a conductor leading from the bottom of the oven to the flue above the oven, whereby air currents are prevented from escaping from the top of the oven during the baking operation, whereby the hot rising currents upon contacting with the vertical walls of the oven and thus caused to descend, will be effectually pulled out of the oven together with the fumes, thus making for a steady baking operation and a more even heat.

A further object of the invention is to provide means in the oven for diverting the inrushing cold air currents when the door is opened, together with means for opening the flue at the top of the oven, whereby said inrushing cold air currents are carried out of the top of the oven without circulating within said oven or materially cooling the same.

Another object of the invention is to provide thermostatic controls for the fuel supply to the burners, whereby the latter are automatically regulated by the temperature within the oven.

A still further object of the invention resides in the provision of means for introducing a steam spray within the oven for sprinkling the loaves or moistening the air when desired.

Further reference will be made herein to the foregoing and other features of the invention, which will be more particularly pointed out.

In the following specification an exemplification of the invention is set forth and this is illustrated in the accompanying drawings in which:

Fig. 1 is a perspective view of an oven constructed in accordance with the invention, Fig. 2 is a horizontal cross-sectional view taken on the line 2—2 of Fig. 3, Fig. 3 is an enlarged transverse vertical sectional view of the oven, Fig. 4 is an end elevation of the oven, Fig. 5 is a detail in plan of the flue and dampers, and Fig. 6 is a detail of the tray guide.

In the drawings the numeral 10 designates one end member of the complete oven and 11 the other end member. Each end member has a base 12. The end members are connected by an upright back wall 13 and an upright wall 14 and these walls are preferably connected with an arched top 15. The cavity enclosed by the end members and the walls constitutes the baking chamber of the oven and these parts may be suitably constructed and properly insulated in accordance with the practices in use among the manufacturers of baking ovens; therefore, no attempt will be made to describe the details of the structure of the parts which have been enumerated because such structure may vary in accordance with the desires of the manufacturer.

The walls 13 and 14 terminate at the top of the base members 12 and the bottom of the baking chamber is closed by a pan 16. This pan has a central panel or table 17 extending longitudinally of the chamber from one base member to the other. Gas burners 18 of suitable structure are mounted on the upper side of the table and are divided into groups A, B and C. Each burner comprises a plurality of burner heads 20 connected by ducts 21 and each burner is supplied with a mixture of air and gas by a tube 22 extending through the pan 16. The tubes of the burners in groups A and B are supplied with gas from manifolds 23 and 24 separated by a plug 25, while the tubes of the group C are supplied with gas from a manifold 26.

The particular structure and type of the burners may vary, but it is desirable to arrange the burners in groups. For instance during a portion of the baking operation it may be desirable to operate all of the burners, and then when the temperature reaches a certain point the group C may be extinguished and if less heat is required, either the group A or B may be cut off as well as the group C.

Gas is supplied from a feed pipe 27 which is connected to risers 28 and 29 respectively, at each end of the oven. Each riser is connected at its upper end with a smaller pipe 30 which in turn is connected with the head of a thermostatic valve 31 having its control tube 32 extending into the baking chamber of the oven. A return pipe 33 extends from the valve 31 at each end of the oven and each pipe 33 is connected with a larger down pipe 34. One of the pipes 34 is connected with the outer end of the manifold 23 while the other pipe 34 is connected with the outer end of the manifold 24.

The pipes 28 and 34 and 29 and 34 are connected by hand valves 35. When it is desired to supply the entire capacity of the risers to the down pipes 34 the valves 35 are open, but when a lesser amount of heat is required the valves 35 are closed so that a reduced amount of gas is fed to the pipes 30 and admitted to the pipes 33 through the thermostatic valves 31, the supply of gas thus being controlled in proportion to the regulation set up by the thermostats.

The gas from the pipes 33 passes down through the pipes 34 to the manifolds 23 and 24 from which it is distributed to the burners 18 of the groups A and B. By this arrangement the heating of the baking chamber may be automatically controlled and may be regulated to a given degree.

A branch pipe 36 leads from the riser 28 and is connected with a pipe 37 leading to a pilot burner 38 at the center of the table 17. Beyond the connection with the pipe 37 the pipe 36 has a cut off valve 39 for controlling the supply of gas to a pipe 40 connected to the end of said pipe 36. The pipe 40 is connected to the manifold 26 for supplying gas to the burners 18 of the group C. When the valve 39 is closed the burners of the group C are extinguished.

It is obvious that in starting a cold oven all of the burners would be utilized, but when the oven became heated the group C would be cut off and the heat controlled thereafter by the thermostatic valves 31. In case of emergency the plug 25 could be turned so as to establish communication between the manifolds 23 and 24. It is obvious that the gas supply means and the burner control are subject to changes and variations within the scope of the invention, and while it is desirable to employ the thermostatic valves they could be omitted.

In the operation of a baking oven the heated currents of course rise in the chamber and it is well known that these currents upon contacting with the inner surfaces of the walls of the baking chamber are cooled to such an extent as to sufficiently reduce their temperature as to cause them to descend. The result of this is to set up an agitation within the baking chamber which has a tendency to smother the fire and cause an uneven temperature. In order to promote a steady temperature within the oven chamber and to carry off the fumes, I close the top of the baking chamber and provide an outlet at the bottom. This outlet includes traps 41 in the form of troughs extending across the ends of the table 17 contiguous to the end walls of the oven. Each trough has an overhanging lip 42 tending to pocket the currents trapped in said troughs. The troughs are connected to a manifold 43 which has connection at its center with a bypass pipe 44 extending through the rear wall 13 upwardly on the outside thereof.

A flue 45 extends through the top 15 of the oven and the pipe 44 discharges into this flue. A pair of semi-circular dampers 46 and 47 respectively, are arranged in the flue below the pipe 44 and are normally closed so as to prevent the air currents and fumes from escaping from the baking chamber. It will be seen that the descending currents, fumes and cooler air currents will be trapped in the troughs 41 and carried off through the bypass pipe 44 to the flue 45.

This will promote combustion in the baking chamber, counteract the cyclonic effect of the descending air currents and cause steady burning of the flames of the burner, thus inducing a more even heat and temperature within the baking chamber. The closing of the bottom of the chamber by the pan 16 will exclude cold air, thus making for economy in fuel and aiding in the maintaining of an even temperature within the oven.

The oven is provided with a pair of doors 48, either of which may be independently opened. These doors are located in the front wall 14 at the mid-height of the oven chamber to give access to the swinging shelves 49 of the usual revolving carrier 50. In order to steady the carriers, each is provided at one end with a pin 51, as is shown in Fig. 6. On the inner face of the end member 10 a pair of converging curved flanges 52 (Fig. 3) are mounted so that the pins 51 pass there-between. These flanges are so located that when a swinging shelf arrives opposite the doors 48 its pin 51 will stand between the upper portions of said flanges thus preventing the shelf from swinging unduly while the pans or trays are being placed thereon or removed therefrom. This is not an essential feature of the invention.

It is sometimes desirable to produce moisture within the baking chamber and also to spray loaves of bread with steam, and for this purpose a steam spray head 53 is disposed longitudinally of the baking chamber adjacent the rear wall 13 and above the axis of the carrier 50. This spray head is supplied with steam from a pipe 54 connected to one end, as is shown in Fig. 1. The spray head is provided with a condensation trap 55 for removing water. The spray head, while helpful, is not essential to the heating elements of the oven.

When a door 48 and one of the dampers controlling the outlet passage 57 are opened an upward draft of heated air adjacent the door is produced which carries upward any cold air entering at the door, and also prevents the escape of hot air at the door into the face of the operator. For this purpose I provide a deflector 56 within the chamber which is formed contiguous to the top 15 and extends from a point just above the doors to a point just beyond the flue 45, thus forming a channel or duct 57 closed at its upper end and open at its lower end and extending longitudinally of the chamber.

Each door 48 has an arm 58 fastened thereto and extending beyond the end of the oven. The projecting end of each arm is rounded to receive the eye of a pitman 59 extending diagonally across the end of the oven. Each of the dampers 46 and 47 has a crank shaft 60 extending through the top wall, as will be obvious from Figs. 1, 4 and 5.

One shaft extends to one end of the oven and the other shaft extends to the opposite end of the oven. Crank arms 61 are provided on the ends of the shafts and each pitman 59 penetrates one of these arms. A coiled spring 62 on each pitman holds the arm against a stop 63 on the pitman.

When one of the doors 48 is opened its arm 58 actuates its pitman 59 whereby the arm 61 connected therewith is swung and one of the dampers 46 is opened. The spring 62 prevents injury to the damper in case the door is opened too far. When the door is opened and the damper is likewise opened, a draft will be created whereby the air currents will be drawn into the channel 57 and conducted to the flue 45. The deflector 56 will prevent to a large extent escape of the heated air currents within the chamber and the opening of one or both doors will cause little effect upon the temperature within said chamber.

While I have illustrated the invention in connection with a revolving carrier it is to be understood that the baking supports or shelves within the chamber can be arranged in any manner desired.

The invention has two important features and the first of these features is the regulation of the temperature within the baking oven. As is obvious, this regulation is due to several features. The pan 16 excludes cold air and the traps 41 and bypass pipe 44 carry off the fumes and descending and objectionable air currents, while the thermostat tubes 32 regulate the temperature when they are used. The other important feature of the invention resides in the means for diverting the inrushing cold air currents when the doors 48 are opened, and this includes the deflector 56, channel 57 and dampers 46 and 47, together with their operating means.

Various changes in the size and shape of the different parts, as well as modifications and alterations, may be made within the scope of the appended claims.

What I claim, is:

1. In a baking oven, a baking chamber, a door at one side of the oven, an outlet in the top of said chamber, a channel within the chamber extending between the door and the outlet for conducting air currents to the outlet when the door is opened, a damper at the discharge from said channel, and a rod extending from the door and having a yielding connection with said damper.

2. In a baking oven, a baking chamber, a door at one side of the oven, an outlet in the top of said chamber, a channel within the chamber extending between the door and the outlet for conducting air currents to the outlet when the door is opened, a damper in said outlet having an operating lever, a rod connecting to said door and extending through the lever, and a spring interposed between the end of the rod and said lever.

3. In a baking oven, a baking chamber, a closure for the bottom of said chamber, fuel burners within the bottom of the chamber, air traps at each end of the bottom of the chamber and communicating with the baking chamber to ventilate the same, and an external conductor connected with said traps.

4. In a baking oven having a plurality of doors, a baking chamber normally closed at its top and bottom to the admission of air, a bypass conductor communicating with the base of the baking chamber for carrying air and fumes therefrom, fuel burners within the bottom of the chamber, a channel connecting with said conductor and extending adjacent the oven doors, and a plurality of dampers controlling said channel and each automatically operated by one oven door.

5. In a baking oven, a baking chamber, a plurality of fuel burners arranged in groups in the bottom of the chamber, a fuel supply, fuel conductors for individual groups, thermostatic valves having temperature tubes extending into the chamber, said valves being connected to the supply and conductors for controlling the feed to the burner groups, and a valved by-pass connecting the supply and conductors to effect fuel feed without thermostatic control.

6. In a baking oven, a baking chamber, a closure for the bottom of said chamber, fuel burners within the bottom of the chamber, air traps at each end of the bottom of the chamber, an external conductor having an interior manifold connected with said traps, an outlet in the top of the chamber connected with said conductor, a passage extending downward from the outlet into the chamber, and a damper in the outlet intermediate the conductor and said passage, whereby there is a constant draft from the air traps and a regulated draft from said passage.

In testimony whereof I affix my signature.

LOUIS D. HOULIS.